INVENTOR:
ALOIS GOLDHOFER

By

Attorney

Feb. 17, 1970   A. GOLDHOFER   3,495,726
LOADING AND UNLOADING DEVICE FOR VEHICLES
Filed May 3, 1968   12 Sheets-Sheet 4

INVENTOR:
ALOIS GOLDHOFER
By
Attorney

Feb. 17, 1970  A. GOLDHOFER  3,495,726
LOADING AND UNLOADING DEVICE FOR VEHICLES
Filed May 3, 1968  12 Sheets-Sheet 9

INVENTOR:
ALOIS GOLDHOFER
By
Attorney

Feb. 17, 1970     A. GOLDHOFER     3,495,726
LOADING AND UNLOADING DEVICE FOR VEHICLES
Filed May 3, 1968     12 Sheets-Sheet 10

INVENTOR:
ALOIS GOLDHOFER
By
*Sherman Lang* Attorney

Feb. 17, 1970  A. GOLDHOFER  3,495,726
LOADING AND UNLOADING DEVICE FOR VEHICLES
Filed May 3, 1968  12 Sheets-Sheet 11

INVENTOR:
ALOIS GOLDHOFER
By
*Sherman Levy*  Attorney

Fig. 31.

United States Patent Office
3,495,726
Patented Feb. 17, 1970

3,495,726
LOADING AND UNLOADING DEVICE
FOR VEHICLES
Alois Goldhofer, Amendingen, near
Memmingen, Germany
Filed May 3, 1968, Ser. No. 726,512
Claims priority, application Germany, May 3, 1967,
1,630,543
Int. Cl. B66p 1/48; B66c 23/72
U.S. Cl. 214—77                                  35 Claims

ABSTRACT OF THE DISCLOSURE

A loading and unloading device for a vehicle comprising lifting apparatuses located at each end of the vehicle load bed. Each lifting apparatus comprises an extensible arm which is pivotable about an axis longitudinal of the platform and which is adapted to support the load from its free end. There are stabilizing supports with each lifting apparatus which can be extended from the side of the vehicle which are adapted to contact the ground during the loading or unloading thereof.

---

This invention relates to a loading and unloading device for loads carried on vehicles, such as finished parts, containers, pallets with finished parts and other heavy loads. More particularly a device in accordance with the invention consists of arms fitted to the loading area of a lorry or trailer which can swing about an axis longitudinal of the vehicle by means of hydraulic, pneumatic or mechanical power.

Different devices of this nature are already known. As an example it has been suggested that a moving bridge hydraulically operated should be fastened to the loading area of a lorry to swing loads fo the purpose of loading and unloading.

Furthermore, it is known for hydraulically operated swings to lift and lower loads to one side but with this kind of arrangement it is only possible to load and unload on one side and these are, therefore, limited in application in places like stores or building sites where loading room is restricted. With these known devices the load-carrying area of the vehicle must be lifted off its suspension springs during the loading or unloading operation by means of jacks, blocks or supports. This requires additional equipment which makes loading unloading more difficult.

It is also known to furnish the lifting crabs with carriers or pulley ropes to which the loads to be lifted can be hooked.

It is also known that carrier beams can be fitted to the platform of a wagon or trailer and loads lifted in this way by means of pulleys or wrenches which can be positioned along the beam.

All these known loading and unloading devices must have the platform or chassis lifted off the suspension springs and well supported.

The purpose of this invention is to provide a loading and unloading device that will minimise the aforementioned disadvantages, save setting-up time and permit loading and unloading from both sides of the vehicle.

It is an object of this invention to construct a loading device that is capable of lifting a variety of different kinds of loads by means of suitable gripping and lifting devices.

A very important feature of this invention is to construct the loading and unloading device omitting additional props or jacks required to lift the load-carrying platform off its springs and, thereby, save extra setting-up time in use.

According to this invention, a loading and unloading device for a vehicle has at each end of a load-carrying platform lifting apparatus comprising an extensible arm pivoted about an axis longitudinal of the platform at its lower end and adapted to support a load from its upper end, a pair of extensible supports one on each side of the arm, each support being pivoted at its upper end to the arm and slidably connected at its lower end on a support rail which is also pivoted at its lower end on an axis longitudinal of the platform, there being a ground engaging foot at the upper (free) end of each support rail, and power means for operating the extension and contraction of the arm and the extensible supports, whereby the two support rails at one side of the platform can be lowered to engage the feet with the ground, and then a load lifted from the platform, swung to the side at which the rails are lowered and then lowered on to the ground or another platform.

Preferably the extensible arm and the extensible supports are telescopic, and the support rails can be locked in an upright position by removable bolts or pins. This gives the device the necessary rigidity against forces transmitted from the vehicle.

To ensure that the support rails are well supported on their bases, jointed support shoes are fitted to the ends of the support rails. These help to hold the support rails in the most suitable position.

To be able to reach further, e.g. bridging the loading platform of some other vehicle, the invention provides telescopic support rails which enable the device to find the best support position.

A further feature makes it possible to fit slide rollers, slide bolts, or slide shoes to the end of the telescopic supports which slide along the support rails and find in conjunction with the telescopic support its best position according to the laws of mechanics.

To make the loading and unloading device to suit the different kinds of loads a head is fitted to the extensible parts of the support arm to which carrying fixtures, e.g. carrier beams, ropes, or bridges can be fitted. It has the advantage that carrier fixtures can be suitably selected to fit the load under various conditions.

From the point of safety for this loading and unloading device, special load-gripping fixtures can be used which are also easy to handle.

Several arrangements in accordance with the invention will now be described, by way of example only, with reference to the accompanying drawings, in which.

In FIGURES 1 to 4 there is shown a trailer vehicle of the type frequently used to carry very heavy or very large loads. This trailer has front and rear road-wheel sections 2, 2′ with a load-carrying platform 3 between them. At each end of the platform 3 there is a lifting mechanism, but as these two mechanisms are identical, only one need be described in detail.

A central telescopic arm 5 is capable of swinging to either side of the platform from its vertical rest position (FIGURE 2) by virtue of a pivot mounting 10 on the platform. At its upper end, the arm 5 carries a fish-plate type head 11, and the upper ends of two telescopic supports 6 and 7 are pivotally connected to the head 11 one on each side of the arm 5. At each side of the platform 3, there is a support rail 8, 9 which is pivoted about an axis 23, 24 parallel with the pivot axis of the arm 5, at its lower end. Each of the supports 6 and 7 is provided with a slide shoe 13, 14 at its lower end, and this shoe is slidable along the rail 8 or 9. Instead of slide shoes, slide rollers or slide bolts may be used.

The arm 5 is made up of several sections 5a, 5b and 5c, and the supports 6 and 7 are also built up from several telescopic sections. Both the telescopic members 6 and 7 are power operated by hydraulic, pneumatic or mechanical means (not shown).

The head 11 carries the attachment means (ropes, hooks, etc.) for the actual load. Each of the rails 8, 9 carries a ground-engaging shoe 15 or 16 at its upper end, and it will be observed that these shoes are pivotally mounted on their respective rails, so that they can engage firmly with the ground when required. The rails 8 and 9 are normally locked in their vertical positions by push bolts or pins 17.

Figure 1:
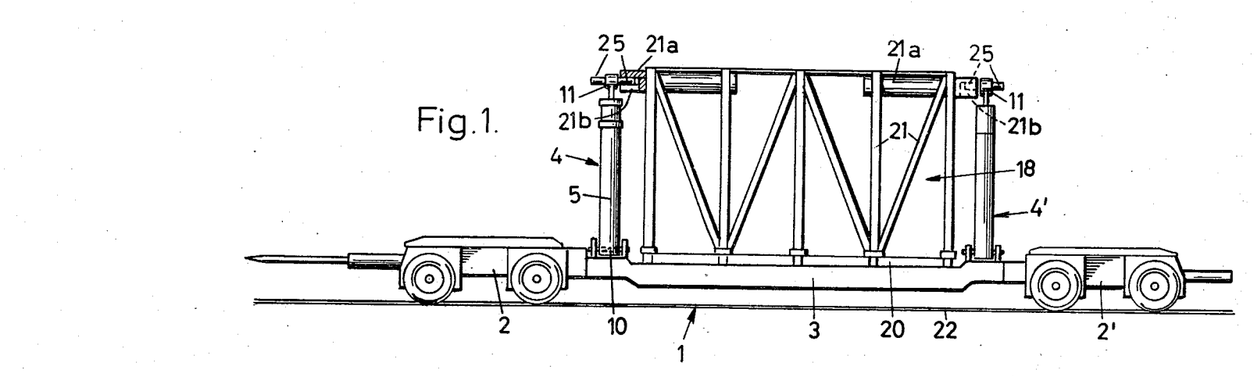
FIGURE 1 is a side view of a trailer vehicle for the transport of heavy loads, fitted with a loading and unloading device.
Figure 2:
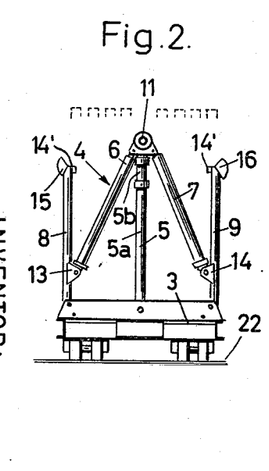
FIGURE 2 is a front view of the vehicle shown in FIGURE 1, with the loading and unloading device in the position of rest.
Figure 3:
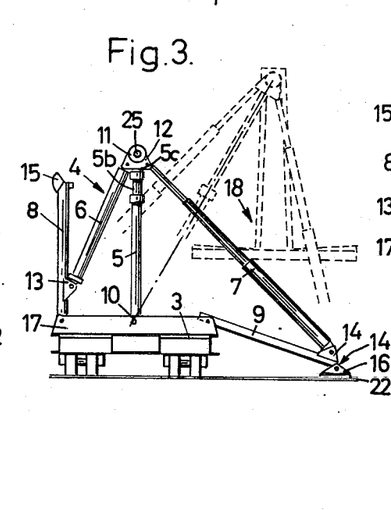
FIGURE 3 is a view similar to FIGURE 2, but showing the position at the commencement of an unloading operation, or near the end of a loading operation in full lines, and an intermediate position in dotted lines.
Figure 4:
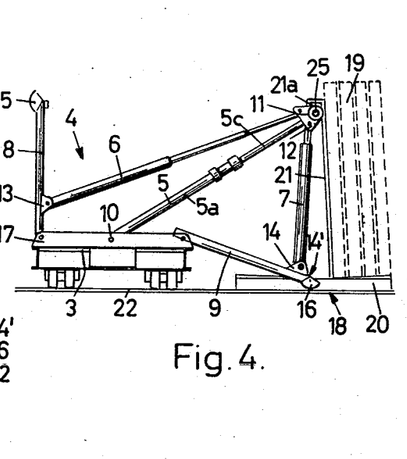
FIGURE 4 is a view similar to FIGURE 2, but at the commencement of a loading operation, with a pallet and load in position.

In FIGS. 1, 3 and 4 there is shown a load comprising a pallet 19, a carrier plate 20 and a stand 21. FIGURE 4 also shows as an example, the load 19 in the form of a series of wall panels for a pre-fabricated house. At the top of the stand 21, there are fixed carrier beams 21a one at each end, and a recess 21b is formed in the underside of each carrier beam, the recesses being also open at the outer ends. Each of the heads 11 is provided with a spigot 25 which is slidable axially in a bearing on the head 11, and for lifting the pallet, the spigots 25 are inserted into the recesses 21b, as shown in FIGURES 1 and 4.

The operation of the device shown in FIGURES 1 to 4 will now be described in detail. Supposing that the load is lying on the ground 22 alongside the trailer as shown in FIGURE 4. The pin 17 is removed to allow the support rail 9 to turn, and the extensible support 6 is operated, so that it extends, and pushes the head 11 over the load side of the trailer. The arm 5 also extends, and the rail 9 descends until its foot 16 rests on the ground, The spigot 25 is then positioned below the recess 21b in the beam 21a, and the support 7 is operated. As the support 7 extends, the spigot 25 engages in the recess 21b and then the load is lifted, and swung about the pivot 10 (see FIGURE 3). During this lifting movement, the load is transmitted to the ground mainly through the foot 16 and it is only as the load begins to swing over the platform 3 that this weight is shifted on to the road wheels. Consequently the chassis does not have to be lifted off its suspension springs.

Once the arm 5 is standing upright, the supports 6 and 7 are contracted and the rail 9 is raised to its upright position and then locked. The load is thus lowered on to the platform.

To unload, the rail 9 is lowered on to the ground and then the lifting and swinging is carried out in the reverse order. When the rail 9 is lowered, the slide 14 at the lower end of the support 7 is allowed to move along the rail until it comes to rest, to ensure a firm base for the loading or unloading operation.

Referring now to FIGURES 5 to 9, there is shown a similar arrangement except that in this instance, the load which comprises a container 26, is supported by ropes 25 which are fastened to the head 11 on the arm 5. The spigots 25 are used to prevent undesirable movement of the load, and for this purpose they are moved axially so that they press against the ends of the load (FIGURES 5 and 6) and then locked against axial movement. This prevents longitudinal movement of the load, and resists swinging of the load during lifting. For improving the gripping of the container by the spigots 25, the latter may be furnished with gripping feet or pads.

Rope thimbles 27 with spigots 28 are provided on the ropes, the thimbles 27 being adapted to engage with brackets provided on the container. These thimbles will be described in detail later.

Figures 5, 6, 9:
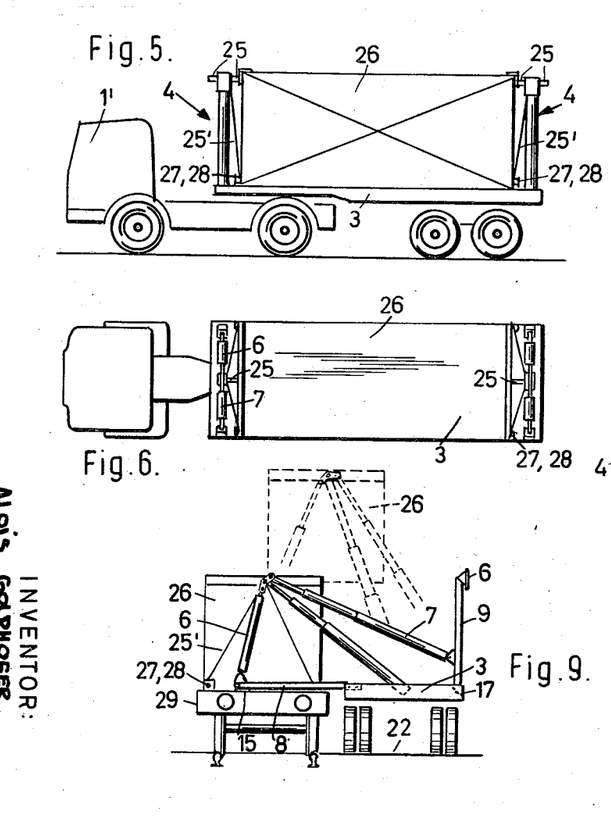
FIGURE 5 is a side view of a tractor and trailer unit with a loading device fitted to the trailer.
FIGURE 6 is a plan view of the unit shown in FIGURE 5.
FIGURE 9 is a view similar to FIGURE 7, but showing the trailer alongside a rail truck and with a load lowered onto the rail truck in full lines, but at an intermediate position in dotted lines.

Supposing that it is required to unload the container 26 from the platform 3 on to a platform 29 of a rail wagon (see FIGURE 9). The trailer 1' is first positioned alongside the wagon and the rail 8 is swung outwardly and downwardly until its shoe 15 rests on the platform 29.

Then the extensible support 6 is extended so that its slide shoe 13 slides along the now horizontal rail 8 until the shoe reaches the position 14. When this has been accomplished, the supports 6 and 7 are extended to lift the container 26 from the loading platform 3, and then the support 7 is operated independently of the support 6, to cause the arm 5 to swing over the side of the platform 3, carrying the container 26 to a position over the platform 29. Finally, the support 6 is contracted, so lowering the container 26 on to the platform 29, and then the rope thimbles 27 can be disengaged from the brackets on the container.

Figure 7:
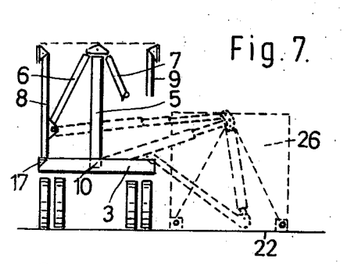
FIGURE 7 is a view of the loading device of FIGURE 5, looking from the front of the trailer, with the loading device at the position of rest in full lines, and at the lifting position in dotted lines.
Figure 8:
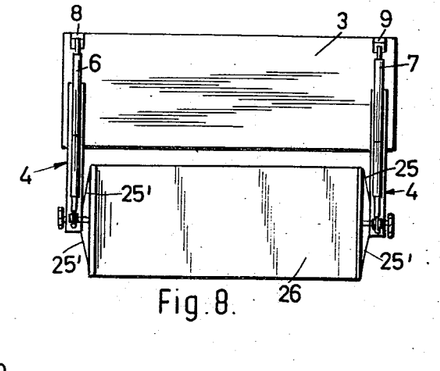
FIGURE 8 is a plan view of the trailer of FIGURE 5, with a load swung to one side.

The unloading of the container from the load-carrying platform 3 of the vehicle on to the ground alongside the vehicle is illustrated in FIGURE 7. This is carried out in the same manner as described with reference to FIGURES 1 to 4. If it is required to load a container 26 from a rail wagon on to a vehicle, the operation of the telescopic supports 6 and 7 and the support rail 8 is done in the reverse order to that described above.

Figure 10:
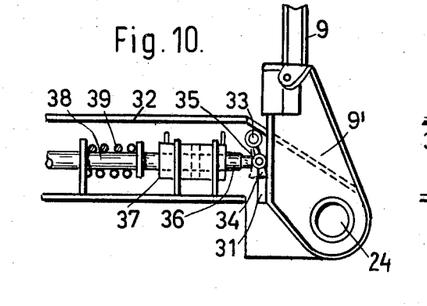
FIGURE 10 is a detail view showing a locking device for the support rails.
Figure 11:
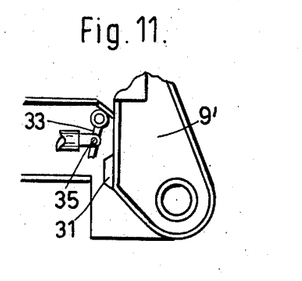
FIGURE 11 is a detail view of some of the parts shown in FIGURE 10 but in a different position.

Referring now to FIGURES 10 and 11 of the drawings, there is illustrated a locking arrangement for the support rails 8 and 9, which is intended to take the place of manually inserted bolts 17. Only the support rail 9 is illustrated in FIGURES 10 and 11, but it will be appreciated that a similar arrangement is provided for the support rail 8. At its lower end, the support rail 9 is provided with a bracket 9' which on its inside is provided with a projecting abutment 31. Part of the support structure for the platform is shown at 32, and a stop 34 is pivoted on a bolt 33 fixed in the support structure 32. Midway along its length, the stop 34 is pivotably connected to the end of a piston rod 36 projecting from a hydraulic cylinder 37 fixed within the support structure.

The piston rod 36 also extends from the opposite end of the cylinder 37, and a slidable push rod 38 is normally pressed into engagement with this projecting end of the piston rod 36 by means of a strong compression spring 39. So long as the hydraulic cylinder 37 is not under pressure, the spring 39 urges the piston rod to the right, as seen in FIGURE 10, and this holds the stop 34 in engagement with the abutment 31, and prevents clockwise movement of the bracket 9' around the pivot 24 for the support rail. Consequently, the support rail is held in the vertical position and cannot swing outwardly.

When it is desired to release the support rail 9, hydraulic fluid is applied to the cylinder 37, in such a manner as to force the piston rod 36 to the left, as seen in FIGURE 10, overcoming the resistance of the compression spring 39, and pulling the stop 34 out of engagement with the abutment 31 (see FIGURE 11). The rail 9 is then free to turn about its pivot 24. When the rail 9 returns to its vertical position, the hydraulic pressure will have been released, so that the stop 34 will once again be in the locking position. As the abutment passes the stop 34, it will deflect it, overcoming the resistance of the spring 39, and then engage underneath the stop 34 so that the rail 9 is once again locked in the vertical position.

With this locking device illustrated in FIGURES 10 and 11, a very simple, safe and easy-to-operate device has been developed. The bolts or pins 17 illustrated in FIGURES 1 to 9, have to be inserted by an operator, and it is possible that their insertion can be overlooked, which would create unsafe working conditions of one of the telescopic supports 6 and 7 or one of the support rails 8 and 9 were to operate unexpectedly. The locking device just described eliminates this danger, by ensuring that the rails 8 and 9 are always locked when they return to the vertical position, and can only be released by the operation of the hydraulic cylinder 37.

Figure 12:
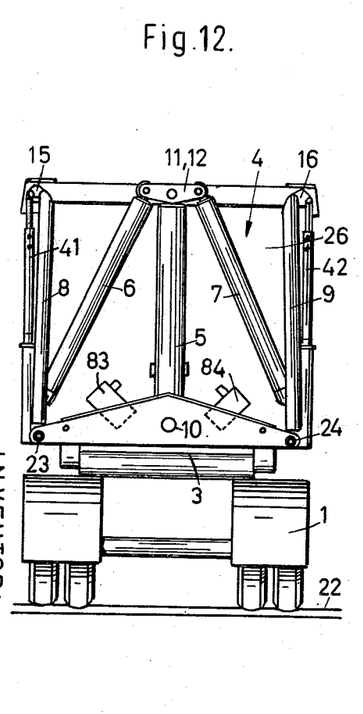
FIGURE 12 is a view on the rear end of a trailer vehicle showing a modified form of loading and unloading device in the rest position.
Figure 13:
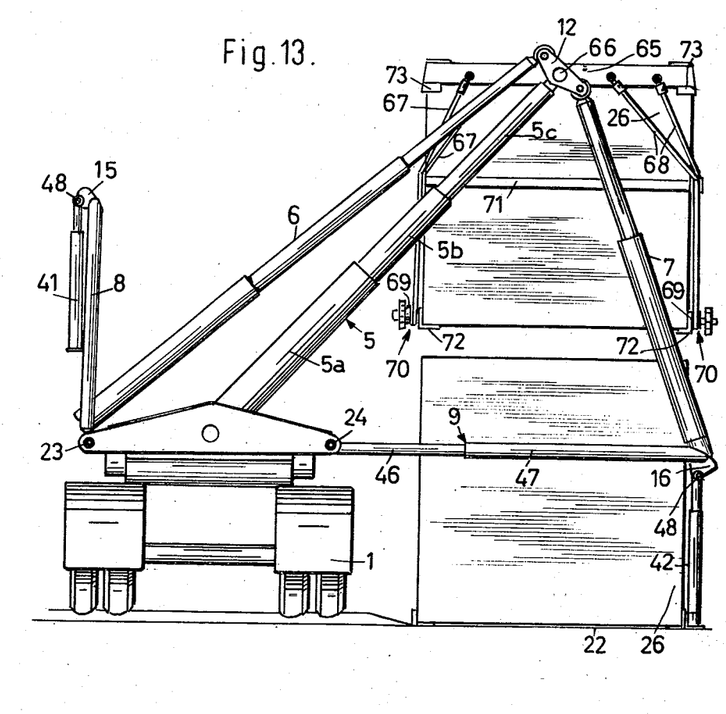
FIGURE 13 is a view similar to FIGURE 12, but showing a container load at an intermediate position.

Another development of the invention is illustrated in FIGURES 12 to 16, in which instead of simple support shoes 15 and 16, the support rails are provided with hinged support struts 41 and 42 which can extend into a vertical position from a horizontally projected support rail 8 or 9 (see FIGURE 13).

Each of the struts 41 and 42 is telescopic, and is constructed from two parts 43 and 44 adapted to be locked in any extended position by locking pins 45.

In this arrangement, it will be noted that each of the support rails 8 and 9 is also constructed in two parts, namely an outer support leg 46 and an inner support leg 47.

Figures 15, 17:
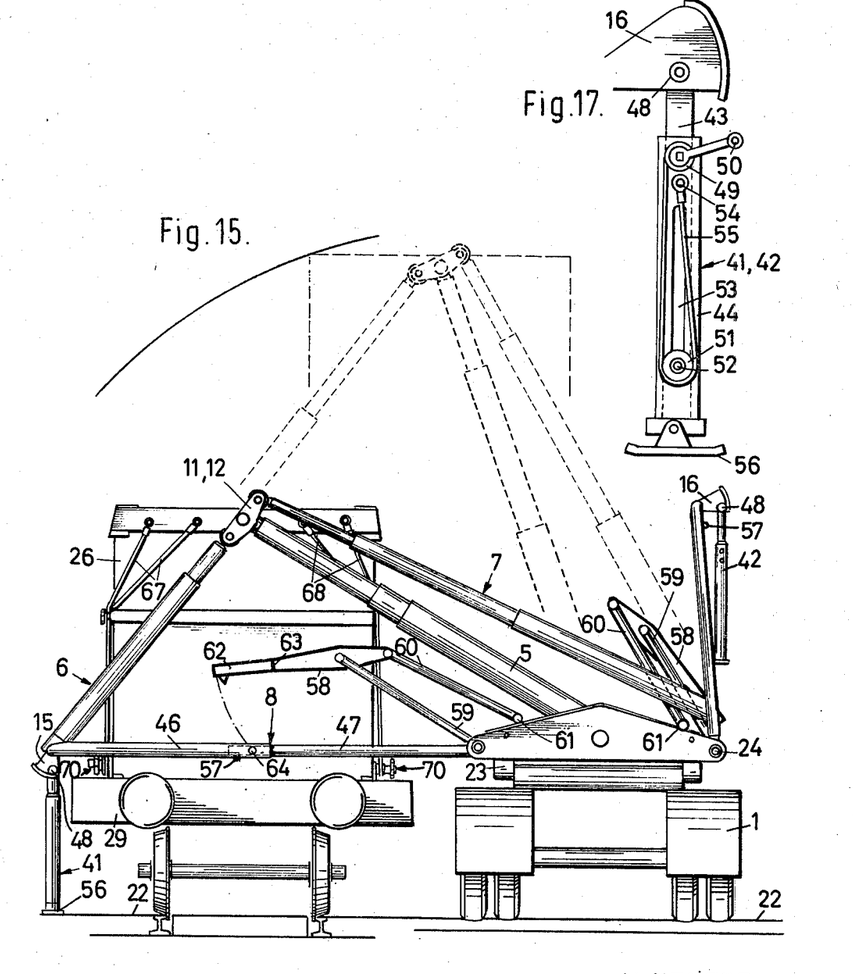
FIGURE 15 is a view similar to FIGURE 14, but illustrating the operation of the loading and unloading device.
FIGURE 17 is a detail view of a hinged support attached to a support rail.
Figure 16:
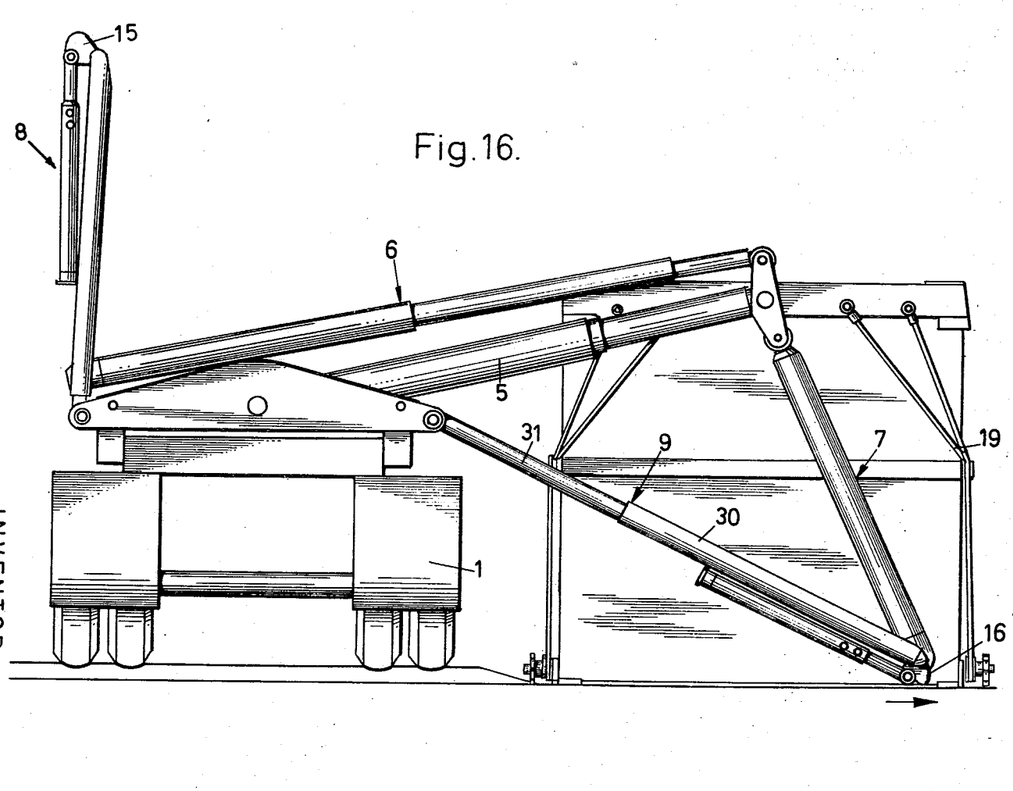
FIGURE 16 is an end view of a trailer similar to that shown in FIGURES 14 and 15, but illustrating unloading onto the floor.
Figure 18:
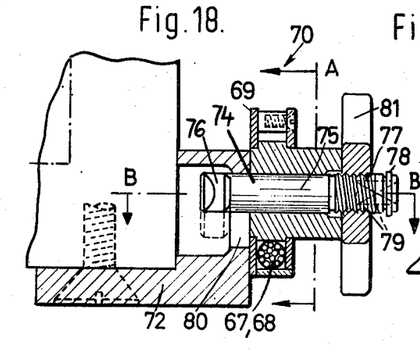
FIGURE 18 is a sectional detail view of a rope attachment.
Figure 19:
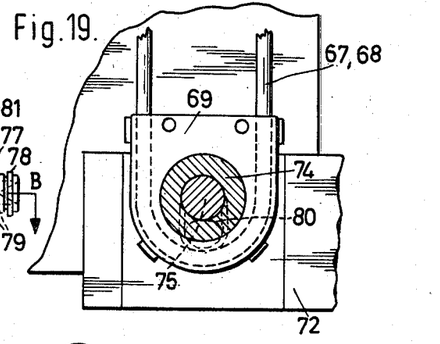
FIGURE 19 is a section on the line A—A in FIGURE 18.
Figure 20:
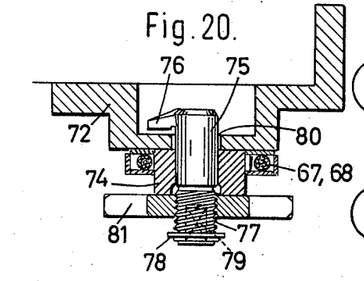
FIGURE 20 is a section on the line B—B in FIGURE 18.
Figure 21:
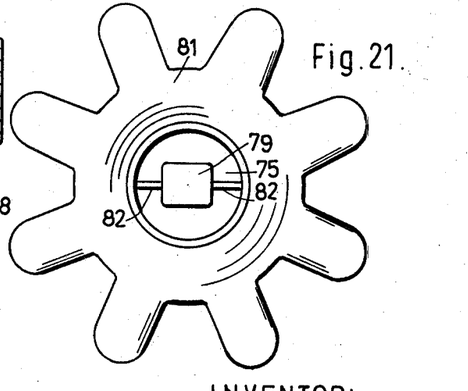
FIGURE 21 is a detail view looking on one end of FIGURE 18.
Figure 22:
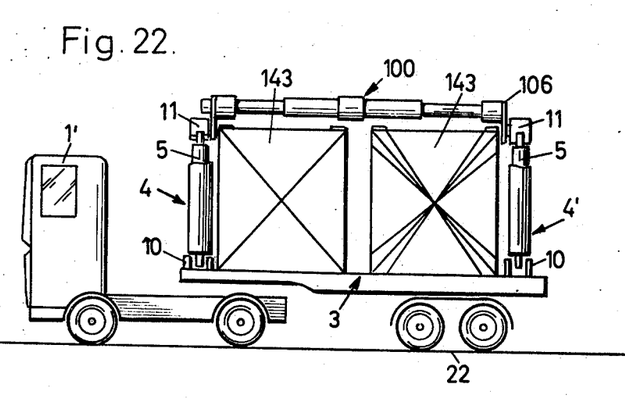
FIGURE 22 is a side view of a tractor and trailer unit fitted with a loading and unloading device of alternative construction, and showing two separate loads in position on the trailer.
Figure 23:
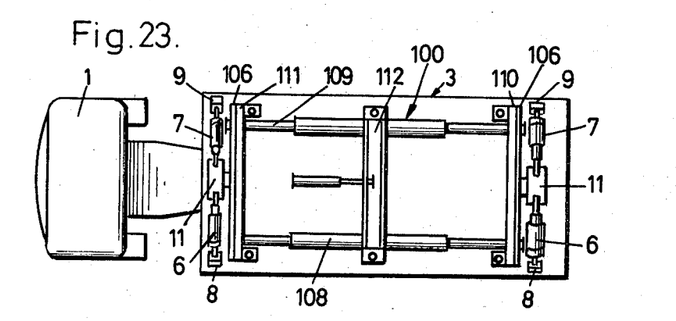
FIGURE 23 is a plan view of the unit shown in FIGURE 22.

FIGURE 17 illustrates a modification, by means of which it is possible to adjust the length of one of the struts 41/42 whilst the assembly is under load. The part 43 of the strut is pivotably connected at 48 with a support shoe 16, carried on the end of a support rail 8 or 9, and a rotatable rope winch 49 is mounted on the upper end of the part 44 of the strut. The winch is provided with a handle 50.

An elongated slot 53 is formed in the part 44, and a spigot 52 fixed to the part 43 projects through this slot and mounts a rope roller 51. One end of a rope 55 is anchored to the winch 49, and the rope then passes down under the roller 51 and up to a bolt 54 fixed to the part 44 where the other end of the rope is anchored.

When the handle 50 is turned in a clockwise direction as seen in FIGURE 17, the rope 55 is wound on to the winch 49, and this causes the roller 51 to be lifted, extending the strut 41 or 42 by pulling the part 43 upwardly. The rope winch is fitted with a ratchet device which holds the handle 50 in any position, and allows it to be operated in either direction of rotation. It is possible with this arrangement to extend or contract the struts, under load, even when the support rails 8 or 9 are already under load through one of the telescopic supports 6 or 7.

In order to ensure a firm support on the ground, the struts 41/42 are furnished with pivoted support shoes 56.

In order to limit the possible extension of the support rail 8 or 9, the inner part 47 of each support rail has on its outer end a spigot lock 57 which travels in a slot of the outer part 46. It is possible to locate the spigot 57 in different positions along the support rail 47 to allow for different permissible extensions of the support rail 8 or 9.

FIGURE 15 illustrates a possible use of a telescopic support rail 8, provided with a telescopic hinged strut 41. As shown in this drawing, a rail wagon 29 has been positioned alongside the trailer vehicle, and the rail 8 is extended horizontally so that its outer end projects beyond the opposite side of the rail wagon 29 to the trailer vehicle. Then the strut 41 is lowered into a vertical position where its foot 56 rests on the ground alongside the rail wagon. Thus the rail 8 takes up a position bridging the wagon ready for lifting the container 26 from the wagon on to the trailer. Once again, it will be noted that the major part of the load during the lifting operation is taken by the strut 41 and the foot 56.

For extending the support rail 8 or 9 to its full length, it is advantageous to provide an actuating arrangement which automatically moves the support rail outer part 46 during the outward and downward swinging of the rail 8 until the spigot 57 engages with the end of the slot in the outer part 46. Such an arrangement is useful because when loads have to be transferred from one vehicle to another, or to a rail wagon, it is difficult to control the support rails 8 and 9 by hand from the ground.

Figure 14:
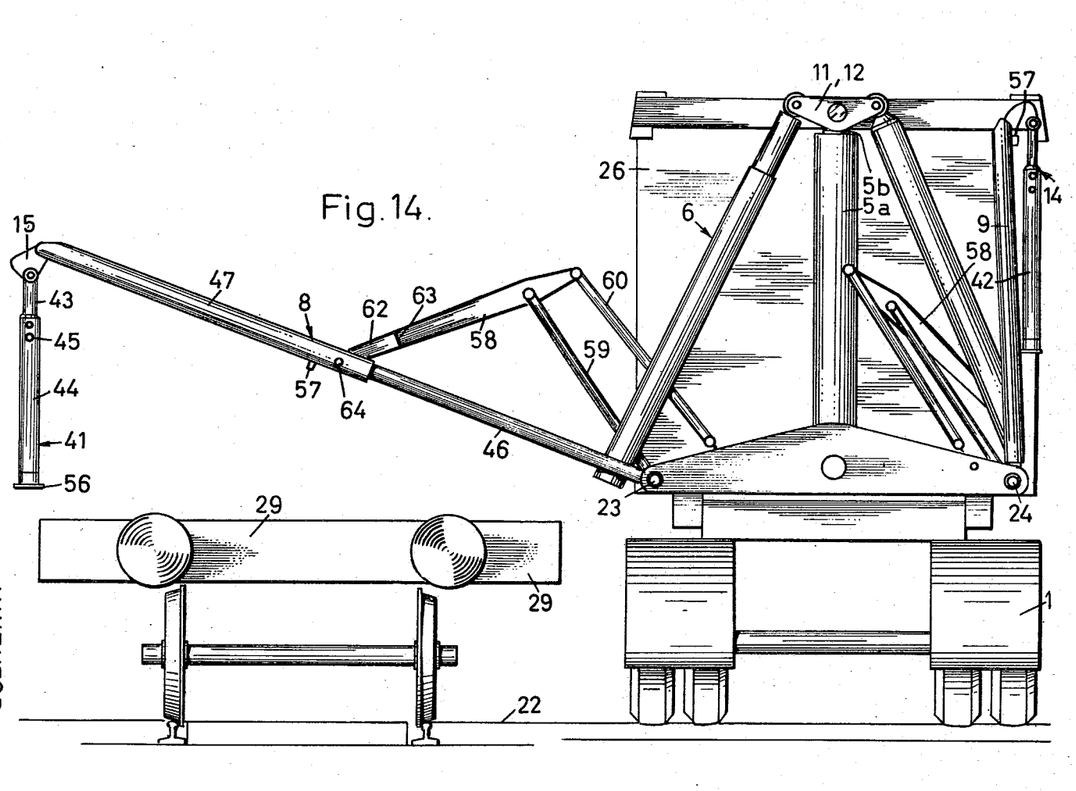
FIGURE 14 is an end view of a trailer vehicle alongside a rail truck, the trailer having a loading and unloading device fitted with a control arrangement for an extensible support rail.

FIGURES 14 and 15 show such an automatic articulation of a support rail 8. A control mechanism 58 is carried on the platform, and has two parallel arms 59 and 60 pivoted at 23 and 61 respectively on the platform 3. A control member 58 is carried by the other ends of the arms 59 and 60, and a guide nut at the outer extremity of the member 58 is limited in its movement by the articulation of the member 58 to the path 36 (see FIGURE 15). On the inside of the support rail outside part 48 is a guide spigot 64, which is capable of engagement with the nut 62 at the end of the control member 58.

On the right hand side in FIGURES 14 and 15, a control member 58 together with its control arms 59 and 60 is shown in the position of rest. When the support rail 8 is lowered to the position shown in FIGURE 14, the control member 58 pushes the outer part 46 of the support rail 8 outwardly on the inner part 47, until the spigot 64 disengages from the nut 62. By this time, the rail 8 is fully extended. The telescopic support 6 then extends and its slide moves outwards to the end of the support rail outer part 46. A stop can be arranged at some point along the support rail 8, in order to prevent the lower end of the support 6 moving to the extremity of the support rail 8, if that is desirable.

When the container 26 is lifted, and the parts of the loading and unloading device begin to move back to the rest position, the support rail 8 swings upwardly because of the pulling action of the telescopic support 6, and the pulling action of the telescopic support 6, and the guide spigot 64 engages into the guide slot 62 of the control member 58. Thereafter, during the continued movement of the members back to the position of rest, the control member pushes the outer part 46 downwards over the inner part 47 to contact the support rail 8. Furthermore, when the support rail arrives at its vertical position, the support rail slides its lower end down the guide rail into the position of rest shown in FIGURE 12.

FIGURES 12 to 16 also illustrate another feature of the invention for loading and unloading large containers such as that shown at 26. In the arrangement shown in these drawings, the head 11 is provided with a different type of lifting fixture. This fixture consists of a beam 65 normally occupying a horizontal position, but capable of swinging about a bearing spigot 66 projecting from the head 11.

Fastened to the beam 65 are ropes 67 and 68, and each of these ropes forms a loop in which there is supported a thimble 69 with a special gripping device 70. Both the ropes 67 and 68 are held apart to the width of the container 26 by a guide rod 71 and this facilitates the fastening of gripping devices 70 on the thimbles 69 to the container 72. For guiding and holding the container on the beam 65 there are guide ropes which sling the container sides.

The facility for turning of the beams 65 relatively to the heads 11 and the support arm 5, can be very helpful when fastening the ropes 67 and 68, and the gripping devices 70 to the container hooks 72, especially if the container is not on a horizontal base.

In order to ensure a safe connection between each gripping device 70, the rope thimble 69 and the lifting hooks on the container, a special arrangement is provided as illustrated in FIGURES 18 to 21.

A rope thimble 69 is illustrated, which is supported in the loop at the lower end of a rope 67 or 68. This thimble consists of a cylindrical body 74 centrally bored to receive a gripping bolt 75. The gripping bolt 75 extends on the rear side of the thimble, and this extending portion has a tongue 76 (see especially FIGURE 20). At the front of the thimble, the bolt 75 projects, and this projecting portion is screw threaded at 77 to receive a wing nut 71 and a safety washer 78. Furthermore, a square hole 79 is formed in the end of the bolt 75.

The corresponding container lifting bracket 72 which is screwed to the container, has an internally recessed portion, in which there is formed a vertically elongated hole 80.

The assembly of the thimble with its gripping bolt 75 is referred to as the gripping device 70, and in order to connect this device to the lifting bracket 72 the wing nut 81 is first screwed back against the safety washer 78 in order to allow the bolt 75 to turn freely in the bore of the thimble 69. A key is fitted into the square hole 79, and the bolt 75 is turned so that its tongue 76 projects vertically downwards. With the bolt in this position, the tongue 76, and the projecting portion of the bolt 75 can be passed through the hole 80 into the bracket 72 as far as possible (i.e. until the rear face of the thimble body 74 abuts against the front face of the bracket 72) and then by using the key in the square hole 79 the bolt 75 is turned through approximately 90° so that the tongue 76 engages behind a solid portion of the bracket 72. Then the wing nut is tightened against the front face of the body 74, pulling the tongue 76 against the inside face of the bracket 72.

In order to give a quick indication of the position of the tongue 76 from the outside, the bolt 75 is marked with a serration 82 indicating the direction of the tongue 76.

In order to disconnect the gripping device 70 from the bracket 72 the wing nut 81 is first screwed back on to the safety washer 80, the key is inserted into the square hole 79, and the gripping bolt is turned through 90° to bring its tongue into line with the elongated hole 80. The serrated marking will then be in a vertical position, and the bolt can be removed from the bracket 72.

This gripping arrangement provides a very safe connection between the ropes and the load, and prevents the load from falling during the lifting operation.

As already described, the arms 5, are fitted at the outer ends of the trailer platform 3, and can swing about the longitudinal centre line of the platform to either side. Because of this arrangement, the loading and unloading devices so far described can only be used for loads having dimensions which are restricted by the distance between the two arms 5. A very limited adjustment between these two arms is possible.

On the other hand, it is usually necessary to deal with containers of varying lengths and this would not be practicable with a loading and unloading device having only a restricted variable distance between its swinging arms. According to an alternative arrangement illustrated in FIGURES 22 to 31 of the drawings, a loading and unloading device is provided which will lift and swing loads of varying sizes. Furthermore, with this device it is also possible to load a series of short containers in a row onto the platform of the trailer without moving the trailer. This particular arrangement also incorporates special gripping fixtures which lock on to the load and hook automatically into gripping brackets on the load thus obviating dangers created by the human factor.

Figure 24:
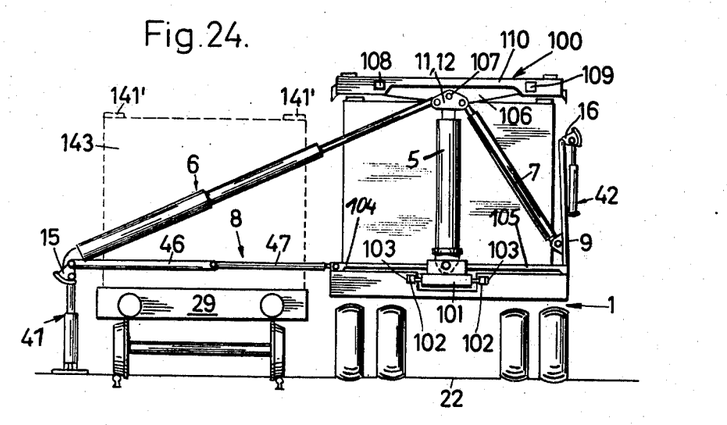
FIGURE 24 is a rear view of the trailer shown in FIGURE 22, with a rail truck alongside and with the loading device ready to begin unloading onto the truck.
Figure 25:
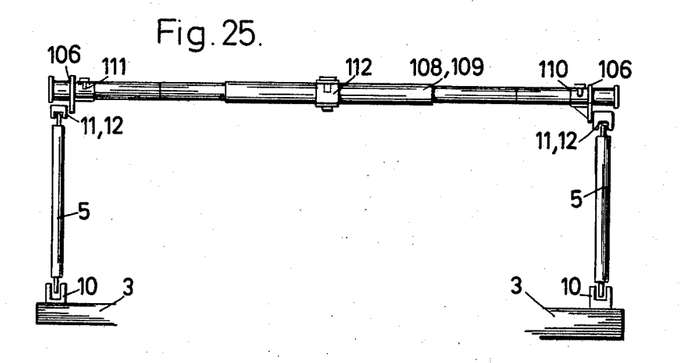
FIGURE 25 is a side view corresponding to FIGURE 22, showing a bridge fully extended.
Figure 26:
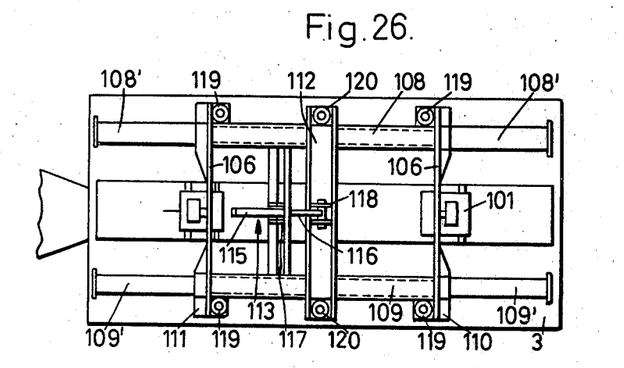
FIGURE 26 is a plan view showing the bridge fully contracted.

As shown in FIGURE 24, a support arm 5 and its pivotable mounting 10, is not fixed to the loading platform 3, but is carried by a plinth 101 which is equipped with rollers 102 engaging on rails 103 formed in the platform. Consequently, the entire unit supported by the plinth 101 is able to move longitudinally of the platform. Arms 104 and 105 extend laterally from the plinth 101, and the lower ends of the support rails 8 and 9 are pivoted to the outer ends of these lateral arms 104 and 105. The arms 104 and 105 lie above the loading platform 3 and can be moved longitudinally with the support rails and the plinth.

On the fish-plate head 11 of the support arm 5, there are laterally extending carrier arms 106 which are supported on a spigot 107 in the head 11. The carrier arms 106 support a bridge 100 which extends between the support arms 5, and bridges the entire loading platform 3. The bridge includes parallel telescopic beams 108 and 109 (see FIGURE 25) extending between the carrier arms 106. The telescopic arrangement of the beams 108 and 109 enables the bridge to contract or extend longitudinally in order to accommodate different loads.

There are three cross-beams, 110, 111 and 112 arranged across the telescopic longitudinal beams 108 and 109 and these cross-beams can be adjusted longitudinally in relation to the platform 3 in conjunction with the support arms 5.

The cross-beam 112 is adjustable over half the distance of the cross-beams 110 and 111 along the beams 108 and 109 and is actuated by an adjustment mechanism 113 which is fitted to a cross-rung of the bridge 100. This adjustment mechanism consists essentially of a hydraulic cylinder 115 and a piston rod 116. The cylinder 115 is connected to the cross-rung 114, and the piston rod 116 is connected through a joint 118 with the cross-beam 112.

Figure 27:
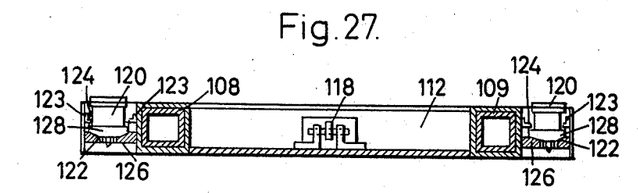
FIGURE 27 is a longitudinal cross-section through the center cross beam of the bridge.
Figure 28:
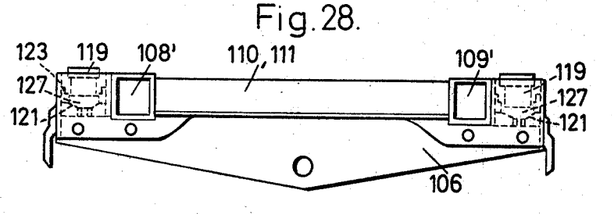
FIGURE 28 is an elevation of an outer cross beam of the bridge.

As shown more clearly in FIGURES 27 and 28, each of the cross-beams 110, 111 and 112 carries lifting fixtures 119 and 120 on the outsides of the longitudinal beams 108 and 109. Each lifting fixture 119 and 120 is located sidewards by spigots 123 and 124 and is supported on a bed 121/122. This allows each lifting fixture a certain amount of play, and each fixture can tilt slightly relatively to the vertical. It may also be preferred to provide a small elastic cushion between the fixing plate 125, 126 and and the cross-beam 110, 111 or 112, and between the support part 127, 128 and the gripping fixtures 119 and 120 which would also give the gripping fixture a slight play.

Figure 29:
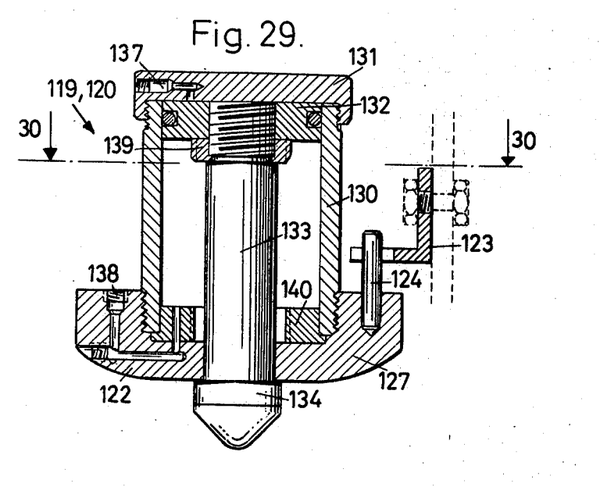
FIGURE 29 is a cross-section through a load-gripping device.
Figure 30:
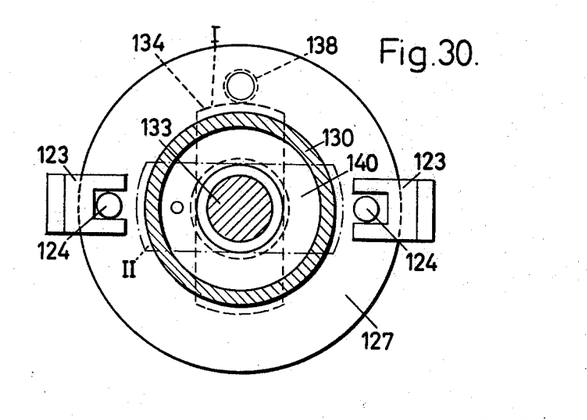
FIGURE 30 is a plan view of the device shown in FIGURE 29.
Figure 31:
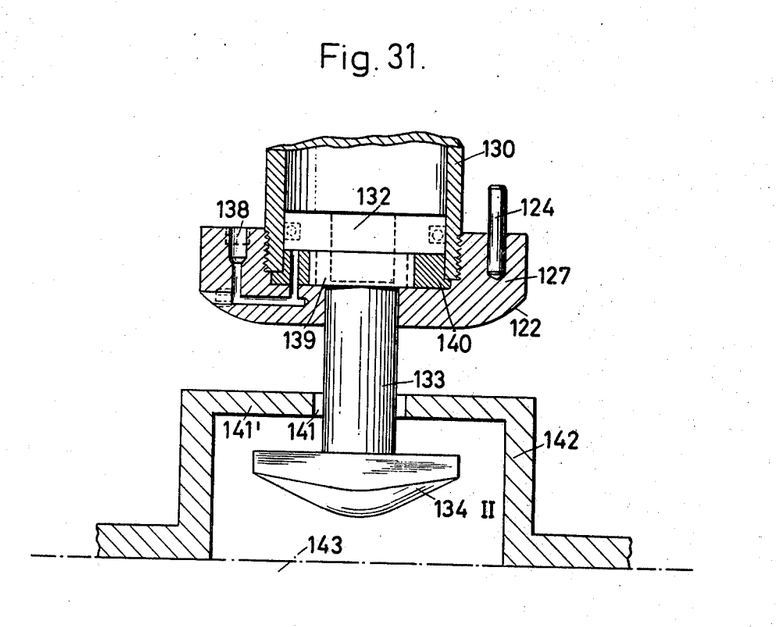
FIGURE 31 is a view similar to FIGURE 29, but showing the parts in a different position.

FIGURES 29, 30 and 31 illustrate a gripping fixture 119 and 120 in greater detail. Such a fixture can hook and lock a container bracket to the cross-beam by remote control. The positioning of the gripping fixtures 119 and 120 in the cross-beams 110, 111 and 112 is arranged so that their spacing coincides with prevailing standard container sizes. This means that it is possible for the gripping fixture 119 to lock tself into a lifting bracket fixed on a standard container, and of course this speeds up the operation.

As shown in FIGURE 29, a gripping fixture of this type consists essentially of a hydraulic pressure cylinder 130 with a screwed on cap 131 and a base 127 at the lower end of the pressure cylinder. A piston 133 works within the cylinder 130, and on its lower end, there is a mushroom-headed crossfinger 134. FIGURE 29 shows an end view of the finger, and FIGURE 31 shows the finger in elevation, there being carrying shoulders 135 and 136 on the finger 134.

The rounding of the lower face of the crossfinger 134 enables it to locate easily in an elongated hole in the lifting bracket of a container. It will be appreciated that since the finger 134 is not fitted manually, it is important to provide for easy fitting of this finger into the bracket hole to allow for any slight inaccuracy in the location of the lifting bracket.

Pressure lines 137 and 138 are provided respectively in the cap 131 and the base 127 and by applying hydraulic fluid through either of these pressure lines, the piston 132 on the piston rod 133 can be caused to move in either direction.

In FIGURE 29, the piston 132 is shown in its rest position, with the crossfinger 134 held up against the underside of the base 127. Fixed to the upper part of the piston rod 133 is a coarse pitch externally threaded member 139, and fixed within the lower end of the cylinder 130 is a correspondingly screw threaded nut 140. The arrangement of the parts 139 and 140 is such, that during the last portion of the downward movement of the piston 132 within the cylinder 130, the member 139 engages in the nut 140, and further downward movement of the piston causes the piston rod to rotate through approximately 90° about its own longitudinal axis.

In FIGURE 30, alternative Positions I and II of the crossfinger 134 are indicated in dotted lines. In Position I the crossfinger 134 is in the rest position corresponding to the position shown in FIGURE 29. From this position, the piston rod 133 moves the finger 134 downwardly until the lower part of its movement, where the finger 134 is turned through 90° to the Position II.

The length of stroke of the piston 132 is such that the crossfinger 134 is already projected through holes 141 in a lifting bracket 142 fixed to the container 143, when the threaded member 139 engages with the nut 140. The rotation of the finger 134 to the Position II locks the finger under the lifting bracket 142, so that the container 143 can be lifted by the bridge 100. Release of the gripping fixture 119, is not possible until hydraulic fluid is admitted to the underside of the piston 132, to move the latter upwardly, first turning the finger 134 back to the Position I. In practice, before disengaging the lifting fixture, the finger 134 will be lowered clear of the bracket 142, to allow easy rotation of the finger.

The arrangement shown in FIGURES 24 to 31 provides the advantages that not only loads of varying lengths can be accommodated, but also that several loads can be lifted, and loads can be transported from one side of a vehicle to the other without moving the vehicle.

Assuming that alongside the vehicle, are two containers which are ready for loading on to the vehicle. The support arms 5 are maneuvered into position, by their telescopic supports 6 and 7, and the support rail 8 or 9 is swung out. The bridge 100 is then brought over the containers and lowered. The cross-beams 110 and 111, the centre cross-beam 112, and the gripping fixtures 119 and 120 will be positioned exactly over the lifting brackets of the containers.

The crossfinger of each of the gripping fixtures 119 and 120 is engaged and locked in the Position II to a lifting bracket 142 as described above. The bridge then lifts the containers on to the load-carrying platform 3 of the vehicle. After the containers 143 are lowered on to the platform of the vehicle, the bridge 100 lowers further than the depth of engagement of the member 139 in the nut 140. The piston rod 132 of the gripping fixture then operates the crossfinger 134 back to the normal Position I, and the crossfinger 134 can then escape through the hole 141 in the lifting bracket.

When positioning the cross-beams 110, 111 and 112 longitudinally of the bridge 100, it is of no importance whether the cross-beams 110 and 112 are moved with the support arms 5 on their movable plinth 101 or independently therefrom.

When loading short but heavy loads, it is desirable that the distance between the bridge 100 and the support arms 5, is kept to a minimum. It is not important whether the cross-beams 110 and 111 or the central cross-beam 112 is used for the lifting operation, but when loading or unloading two containers which have to be placed one behind the other, it is necessary to use the lifting arrangement of the middle cross-beam 112.

It should be mentioned, that in the last described arrangement, the lifting fixture 119 or 120, cross-beams 110, 111 and 112, and bridge 100 on the support arms 5 have a limited height which is also variable. Because the bridge can be lowered to an extent that will enable it to engage with a positioned load, it is also possible to use the bridge with very high loads.

As shown in FIGURE 12, limit switches 83 and 84 can be positioned on opposite sides of the swinging arm 5, to limit the swing of the arm 5. The limit switches can be used to give a signal to switch off the power mechanism causing the swinging movement.

What I claim is:
1. A loading and unloading device for a vehicle having at each end of a load-carrying platform lifting apparatus comprising an extensible arm pivoted about an axis longitudinal of the platform at its lower end and adapted to support a load from its upper end, a pair of extensible supports one on each side of the arm, each support being pivoted at its upper end to the arm and slidably connected at its lower end on a telescopically extensible support rail which is also pivoted at its lower end on an axis longitudinal of the platform, there being a ground-engaging foot at the upper (free) end of each support rail, and power means for operating the extension and contraction of the arm and the extensible supports, whereby the two support rails at one side of the platform can be lowered to engage the feet with the ground, and then a load lifted from the platform, swung to the side at which the rails are lowered and then lowered on to the ground or another platform.

2. A loading and unloading device as claimed in claim 1, in which each support rail can be locked against turning about its pivot, by a resiliently loaded stop engageable with an abutment fixed to the support rail, there being mechanism for overcoming the resilient loading to release the rail.

3. A loading and unloading device as claimed in claim 2, in which a hydraulic ram and cylinder is provided to oppose the resilient loading of the stop.

4. A loading and unloading device as claimed in claim 1, in which each foot is carried by an extension strut hinged to the support rail.

5. A loading and unloading device as claimed in claim 4, in which each extension strut is telescopic and provided with locking means to prevent relative movement between its telescopic parts.

6. A loading and unloading device as claimed in claim 5, in which each strut has a rope gear for length adjustment.

7. A loading and unloading device as claimed in claim 5, in which each strut has a stop limit to its extension.

8. A loading and unloading device as claimed in claim 1, in which each support rail is telescopic, and control means are provided whereby the support rail is extended during its outward turning movement and contracted during its inward turning movement.

9. A loading and unloading device as claimed in claim 8, in which the control means are so arranged that the extension of the support rail takes place during the first part of its outward turning movement and the contraction takes place during the last part of its inward turning movement.

10. A loading and unloading device as claimed in claim 9, in which the control means comprises an arm articulated to the load-carrying platform and having an automatically releasable connection with the upper part of the support rail, the said connection being constrained by the articulation of the arm to follow a path which will cause the upper part of the support rail to move relatively to the lower part during that part of the turning of the support rail in which the connection is operative.

11. A loading and unloading device as claimed in claim 10, in which the releasable connection comprises an open-ended slot in the arm adapted to receive a spigot on the upper part of the support rail.

12. A loading and unloading device as claimed in claim 1, in which the extensible arm has a fish-plate head to which the upper ends of the extensible supports are pivotably connected one at each side of the extensible arm, there being a load support also attached to this head.

13. A loading and unloading device as claimed in claim 12, in which a spigot projects from the fish-plate head in the longitudinal direction of the load platform to receive ropes or a lifting assembly for the load.

14. A loading and unloading device as claimed in claim 13, in which a carrier beam is rockably mounted on the spigot.

15. A loading and unloading device as claimed in claim 14, in which there are ropes fastened to the beam which have gripping fasteners which can be connected to lifting brackets on the load.

16. A loading and unloading device as claimed in claim 15, in which each rope has a thimble from which there projects a rotatable spigot having a tongue at its outer end, the projecting part of the spigot being engageable in a non-circular hole in a bracket which can be fixed to the load, so that the thimble can be locked to the bracket by turning the spigot to bring its tongue behind a solid part of the bracket.

17. A loading and unloading device as claimed in claim 16, in which the spigot is axially movable in the thimble and has a screw-threaded portion with which there engages a locking nut to draw the tongue against the solid part of the bracket.

18. A loading and unloading device as claimed in claim 1, in which means are provided to limit the swinging of the extensible arm to either side.

19. A loading and unloading device as claimed in claim 18, in which stops are provided to limit the swinging of the extensible arm.

20. A loading and unloading device as claimed in claim 18, in which limit switches controlling the power means are provided to limit the swinging of the extensible arm.

21. A loading and unloading device as claimed in claim 1, in which a bridge is provided extending between the upper ends of the extensible arms at each end of the load-carrying platform.

22. A loading and unloading device as claimed in claim 21, in which at least one load gripping assembly is longitudinally adjustable on the bridge.

23. A loading and unloading device as claimed in claim 21, in which the bridge can rock on a longitudinal axis.

24. A loading and unloading device as claimed in claim 22, in which the load gripping assembly is carried by a cross-beam movable longitudinal on the bridge.

25. A loading and unloading device as claimed in claim 24, in which there are three cross-beams of which at least the middle beam is adjustable.

26. A loading and unloading device as claimed in claim 25, in which the outer cross-beams are connected to the extensible arms and are adjustable together or independently longitudinally.

27. A loading and unloading device as claimed in claim 21, in which the bridge is telescopic in the longitudinal direction.

28. A loading and unloading device as claimed in claim 26, in which the movable cross-beam or beams is or are power operated.

29. A loading and unloading device as claimed in claim 1, in which one or each extensible arm is supported on a plinth adjustable longitudinally on the platform, the support rails being pivoted on arms extending laterally from the plinth.

30. A loading and unloading device as claimed in claim 22, in which a load gripping device is provided, which has a movable gripping finger adapted to be moved automatically into the load gripping position when it is lowered into contact with the load.

31. A loading and unloading device as claimed in claim 30, in which the finger is carried by a fluid pressure operated piston rod, there being means for rotating the piston rod towards the lower end of its permitted movement.

32. A loading and unloading device as claimed in claim 31, in which there is a fixed coarse pitch threaded nut with which a corresponding threaded part of the piston rod engages to provide a turning movement of approximately 90°.

33. A loading and unloading device as claimed in claim 30, in which the gripping device is able to rock on its cross-beam.

34. A loading and unloading device as claimed in claim 24, in which a load gripping device is provided at each end of said cross-beam.

35. A loading and unloading device as claimed in claim 24, in which said load gripping device is provided at the middle of said cross-beam.

References Cited

UNITED STATES PATENTS

| | | | |
|---|---|---|---|
| 2,771,197 | 11/1956 | Leffler | 214—77 X |
| 2,971,661 | 2/1961 | Isaacs | 212—8 X |
| 3,074,573 | 1/1963 | Cole | 214—77 X |
| 3,174,630 | 3/1965 | Tantlinger et al. | 212—8 |
| 3,233,759 | 2/1966 | Turturro et al. | 214—80 |
| 3,239,080 | 3/1966 | Corompt | 214—77 |
| 3,249,235 | 5/1966 | Roberts | 212—8 |

GERALD M. FORLENZA, Primary Examiner

R. J. SPAR, Assistant Examiner

U.S. Cl. X.R.

212—145